United States Patent
Matthews, Jr. et al.

(10) Patent No.: US 6,457,125 B1
(45) Date of Patent: Sep. 24, 2002

(54) ENCRYPTED DOWNLOAD OF SRAM-BASED FPGAS

(75) Inventors: Donald P. Matthews, Jr., Morgan Hill; Ralph R. Bestock, Los Altos, both of CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/212,003

(22) Filed: Dec. 14, 1998

(51) Int. Cl.$^7$ ................................................ G06F 1/24
(52) U.S. Cl. ........................ 713/160; 713/161; 713/168
(58) Field of Search ................................. 713/160, 161, 713/168

(56) References Cited

U.S. PATENT DOCUMENTS 5,675,645 A   10/1997  Schwartz et al.
5,784,463 A  * 7/1998  Chen et al. ................... 380/21

OTHER PUBLICATIONS

Schneier, "Applied Cryptography", 1995, sec. 9.1, 9.2.*

* cited by examiner

*Primary Examiner*—Thomas R. Peeso
(74) *Attorney, Agent, or Firm*—Leah Sherry; Oppenheimer, Wolff & Donnelly LLP

(57) ABSTRACT

Method and apparatus is provided for securely configuring a programmable hardware device from a remote source. The programmable hardware device includes a plurality of programmable logic modules. A host receives configuration information from the remote source, where the configuration information defines a function of the programmable logic modules. The host encrypts the configuration information according to a cryptographic algorithm. The encrypted information is transferred to a special download engine at the programmable hardware device, which decrypts the information according to the same cryptographic algorithm. The programmable logic modules are thus configured by the decrypted configuration information, which has been securely downloaded from the remote source.

21 Claims, 5 Drawing Sheets

ENCRYPTED DOWNLOAD OF SRAM-BASED FPGAS

BACKGROUND OF THE INVENTION

This invention relates to programmable hardware devices and more particularly to an apparatus and method of securely configuring programmable hardware devices that are reprogrammed when powered up.

Programmable hardware devices are general-purpose, combinational or sequential digital components that can be programmed to perform a certain function. They are also referred to as programmable logic devices (PLDs) or programmable arrays, and part of their basic structure includes a matrix of programmable logic modules or switches that can be configured to implement a complex circuit that performs a certain function. The programmable logic modules can consist of nodes of fuses, antifuses, floating-gate metal oxide semiconductor (MOS) transistors, random access memory (RAM) cells, or static RAM (SRAM) cells.

Fuse and antifuse based programmable hardware devices are physically programmed by having the fuse nodes "blown" into a permanently on or off state. Floating gate, or flash, memory cells are nonvolatile and remain electrically programmed until erased. RAM based cells are volatile and must be electrically programmed each time the programmable hardware device is powered-up. Both flash and RAM based cells are programmed by providing to the programmable hardware device a data stream of configuration information. The configuration information defines a function that each programmable logic module will perform, or collectively defines the combinational function of the programmable hardware device. The configuration information is usually highly sensitive and proprietary information.

Programmable hardware devices can generally be classified according to one of two categories: one-time programmable; and reprogrammable. In the first category, the programmable logic modules of the device are programmed once, usually where the device is manufactured, such as with fuse and antifuse based devices. Such devices are permanently nonvolatile, meaning their configuration can not be changed once the device is programmed. In the second category, the configuration information is stored first in an external source such as a memory. The configuration information is downloaded into the device to configure the logic modules. To reprogram the device, an existing configuration of the programmable logic blocks is deliberately erased and another configuration is downloaded, such as with flash memory, or power is simply removed and another configuration is downloaded upon power-up, such as with RAM.

The present invention is directed to configuring programmable hardware devices of the second category. FIG. 1 shows a simplified block diagram of a prior art system 100 for configuring a reprogrammable hardware device 110 from an external host 130 or other external memory source. The basic architecture of a programmable hardware device 110 includes a matrix of programmable logic modules 120 surrounded by an addressable interconnection network 135. Each logic module 120 may be any one of a variety of circuits capable of being programmed to implement all logic functions having one or more inputs. Such circuits include transistor-based registers, multiplexers, or look-up tables. Often, they also contain sequential elements such as flip-flops or latches. In gate array technology, the interconnection pattern is defined by metallization layers applied over a programmable logic module pattern at the final stage of manufacture.

The interconnect network 135 is connected by input/output blocks (I/O) 145 to a configuration engine 140 that configures the logic modules 120 according to configuration information, or a program, received from the host 130 via a communications channel 150. The configuration engine contains a memory for storing the configuration information, which memory can be flash, such as erasable programmable read only memory (EPROM) and electrically erasable programmable ROM (EEPROM), or static RAM (SRAM). Host 130 may be a memory, a processor linked to a memory, or connected to a memory in a data network such as the internet. An example of a programmable hardware device as described above is described in greater detail in U.S. Pat. No. 5,744,980.

One problem that arises is that the communications channel 150 between the host 130 or external memory source and the programmable hardware device 110 is particularly vulnerable to monitoring by an outside "attacker." By monitoring the download process of transferring configuration information from the host 150 to the programmable hardware device 110, an undesirable entity could gain enough information to reconstruct a proprietary configuration for their own applications. Accordingly, there is need for a system and method to securely download configuration information into a programmable hardware device.

SUMMARY OF THE INVENTION

The present invention provides a method and apparatus to securely configure a programmable hardware device to inhibit copying of configuration information which defines a programmable function of the device.

Secure configuration of a programmable hardware device is achieved in one embodiment of the invention by the steps of encrypting configuration information according to a cryptographic algorithm, transferring the encrypted configuration information from a host to the programmable hardware device, decrypting the configuration information according to the same cryptographic algorithm, and configuring a plurality of programmable logic modules in the programmable hardware device according to the configuration information.

In an alternate embodiment, the host receives the configuration information from an external memory source in encrypted form. The host may then store the encrypted configuration information for later transfer to the programmable hardware device.

In yet another embodiment, the host decrypts encrypted configuration information received from an external memory source. The host then again encrypts the configuration according to the same or a different cryptographic algorithm. The host transfers the again encrypted configuration information to the programmable hardware device.

In yet another embodiment, the present invention provides a novel download engine for programmable hardware devices. The download engine includes a data-in register having a communications channel for receiving encrypted configuration information from the external host, a cryptographic engine, coupled to the data-in register and configured to decrypt the encrypted configuration information according to a cryptographic algorithm, and an interface coupled to the cryptographic engine, for transferring the decrypted configuration information from the cryptographic engine to the programmable logic modules.

DESCRIPTION OF THE SPECIFIC EMBODIMENTS

The figures and the accompanying description below are examples of the preferred embodiment of the present invention and a few variations. A person of ordinary skill in the art will understand that many of the specific details of the embodiments shown here can be varied without departing from the novelty of the invention.

Figure 1:
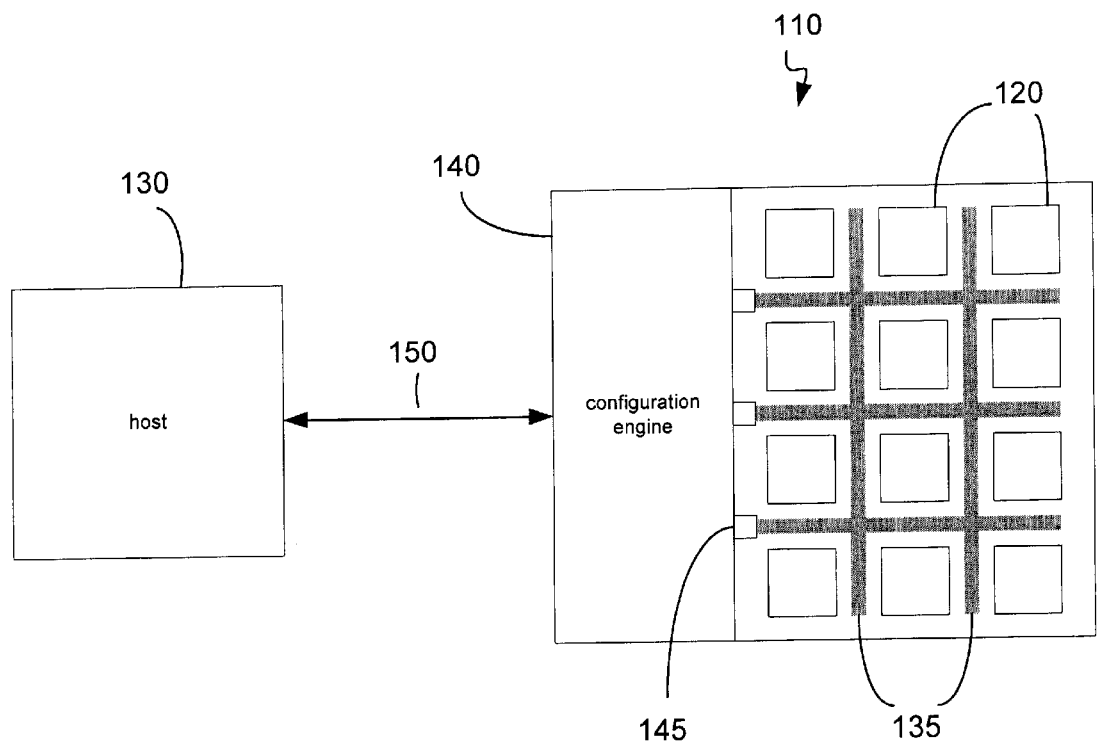
FIG. 1 is a simplified block diagram of a prior art system for configuring a programmable hardware device.
Figure 2:
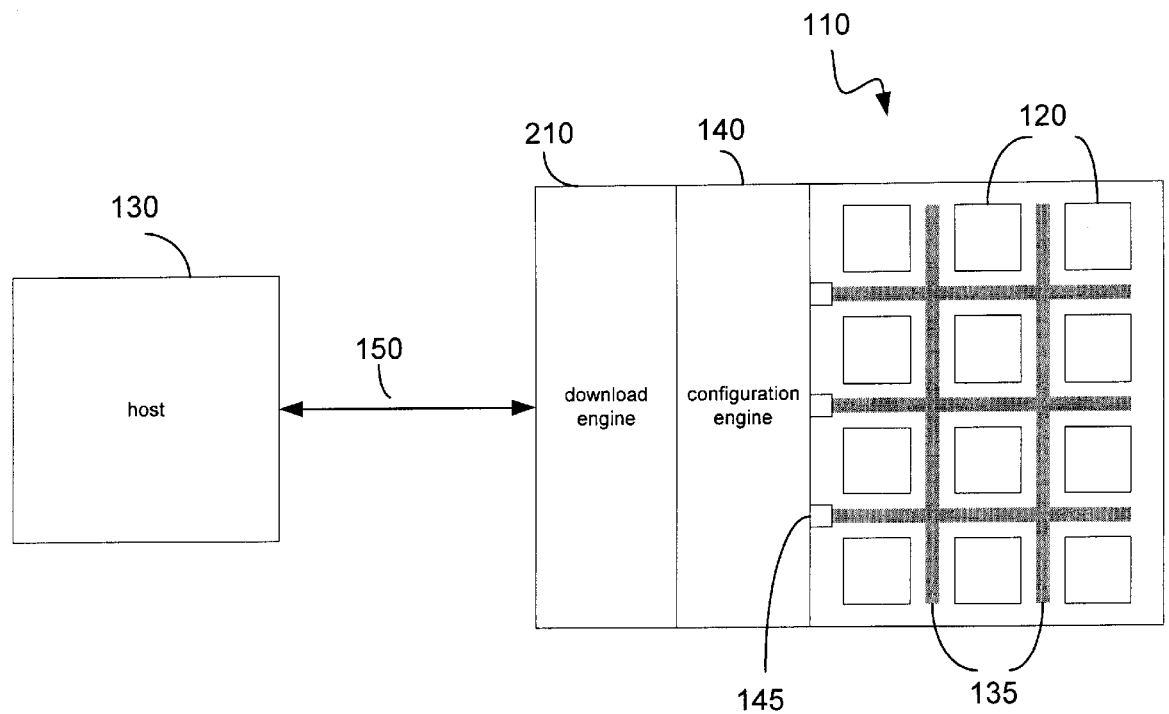
FIG. 2 is a simplified block diagram of a system for securely configuring a programmable hardware device according to an embodiment of the present invention.

Referring now to FIG. 2, there is shown a simplified block diagram of one embodiment of a system 200 for securely configuring a programmable hardware device 110 according to the present invention. Programmable hardware device 110 has a download engine 210 provided between the communications channel 150 and the configuration engine 140 of the programmable hardware device 110. Programmable hardware devices presently available contain both mask programmable and field programmable logic modules. In a preferred embodiment, download engine 210 is implemented in a mask programmable portion of a programmable hardware device as an application specific integrated circuit (ASIC).

Figure 3:
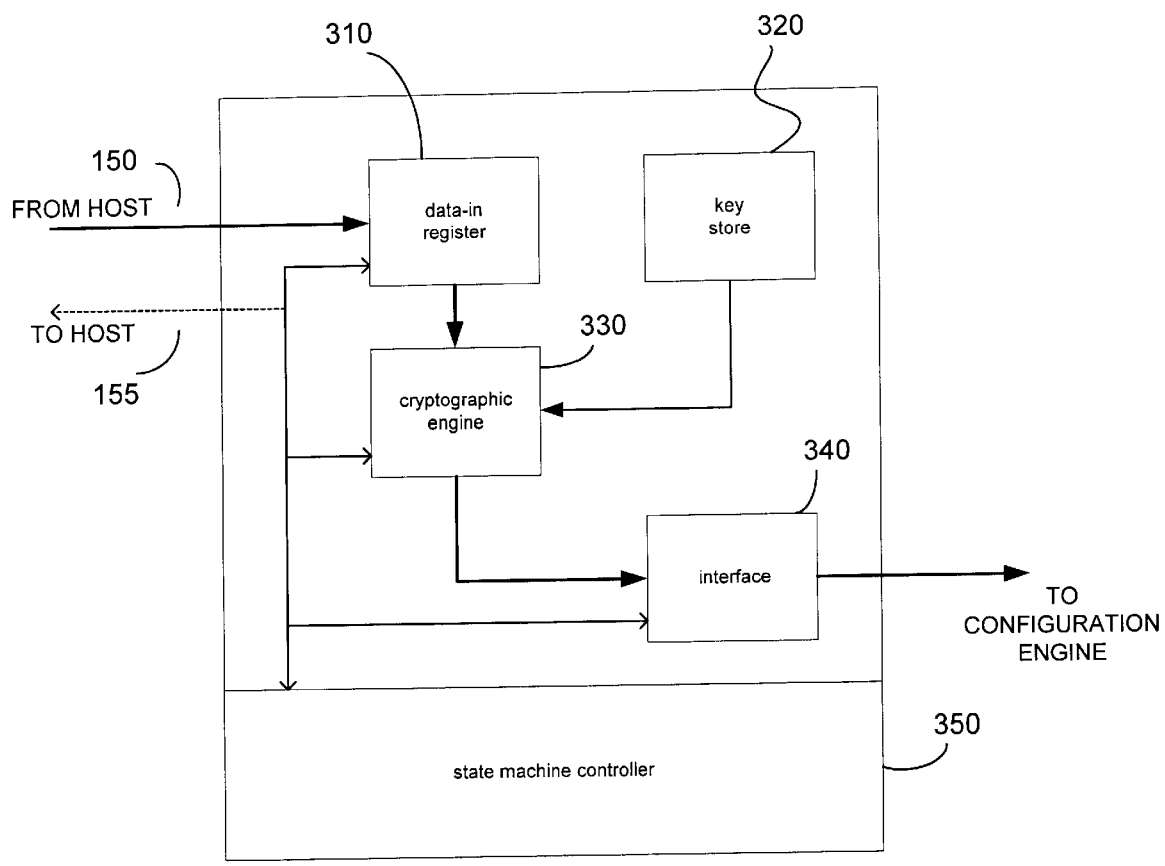
FIG. 3 illustrates a download engine in a programmable hardware device according to an embodiment of the present invention.

FIG. 3 shows a more detailed view of an embodiment of a download engine 210 according to the present invention. As shown in FIG. 3, download engine 210 includes a data-in register 310, a cryptographic engine 330, and an interface 340. The data-in register 310 receives encrypted data from the host via communications channel 150. Data-in register can be a RAM bank of any size. As data-in register 310 fills up with data, the data is passed to a cryptographic engine 330. Cryptographic engine 330 stores and executes a cryptographic algorithm such as Data Encryption Standard (DES) or 3DES, which are well known cryptographic standards in the art. It should be understood that many other cryptographic algorithms and schemes can be used in place of DES or 3DES. The cryptographic engine 330 executes the cryptographic algorithm to decrypt encrypted data passed on from data-in register 310. Coupled to the output of the cryptographic engine is an interface 340 to the configuration engine. Interface 340 stores the decrypted configuration information into a format suitable for the configuration engine 140 to receive and load into the programmable logic modules 120.

In a preferred embodiment, the download engine 210 will have a key store 320 consisting of nonvolatile or battery-backed memory that stores a cryptographic key. A cryptographic key is a secret value and is a function of the cryptographic algorithm utilized by the cryptographic engine 330. For the decryption operation to execute, the proper decryption key must be used. Therefore, the key represents the security of any cryptographic system, and for the present invention it is preferably stored in a memory separate and apart from the cryptographic engine but within the same security envelope or secured geographical area. It should also be evident to one skilled in the art that the key store 320 could be external to the download engine 210 and coupled to the download engine by another communications channel. In yet another embodiment of the present invention, the download engine 210 may execute a key exchange with whichever cryptographic engine encrypted the configuration information. For example, key store 320 may be implemented in a public key algorithm where the key is passed to key store 320 by a public key exchange.

In some architectures, it may be desirable to control the timing and command of the data-in register, the cryptographic engine, and the interface. FIG. 3 shows a state machine controller 350 coupled to data-in register 310, the cryptographic engine 330, and the interface 340 to provide timing and control commands and signals. State machine controller 350 may also be in communication with the host via data channel 155 for exchanging command, timing and synchronization signals such as interrupts.

Figure 4:
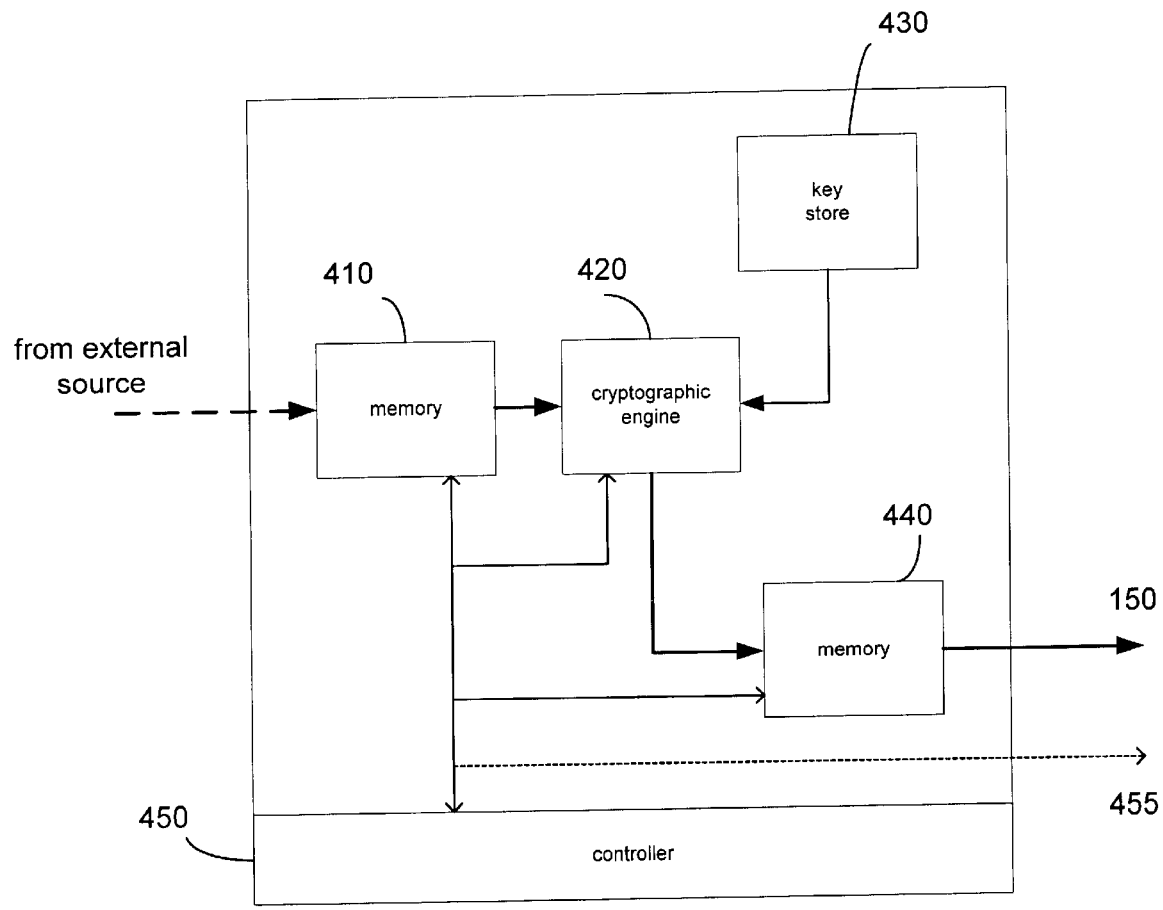
FIG. 4 illustrates a host processor for providing encrypted configuration information to the programmable hardware device.

FIG. 4 illustrates a host according to one embodiment of the present invention. Host 130 receives configuration information from an external memory source, which can include a remote memory in a computer workstation, or part of a network such as the internet or a local area network (LAN). Host 130 includes a first memory 410, a cryptographic engine 420 preferably coupled to a separate key store 430, and a second memory 440 coupled between the output of cryptographic engine 420 and the communication channel 150.

The configuration information received by first memory 410 may be either encrypted or unencrypted. Encrypted information is known as cyphertext; non-encrypted information is known as plaintext. If first memory 410 receives the configuration information as cyphertext, it will either pass it on to second memory 440 without further cryptographic processing, or pass it on to cryptographic engine 420 for decryption and re-encryption. Decryption will be accomplished according to the cryptographic algorithm and key employed by the external memory source to encrypt the configuration information. Encryption may be accomplished using the same algorithm or a different algorithm, or using a different cryptographic key. If first memory 410 receives the configuration information as plaintext, memory 410 passes it on to cryptographic engine 420 for encryption. In any case, second memory 440 is adapted to receive, store, and transfer encrypted, or cyphertext, configuration information. It may also be desirable for the host 130 to include a controller 450 to control the command and timing of the memories and cryptographic engine. Controller 450 can include a communications channel 455 to communicate command interrupts and synchronization signals to the download engine.

Figure 5:
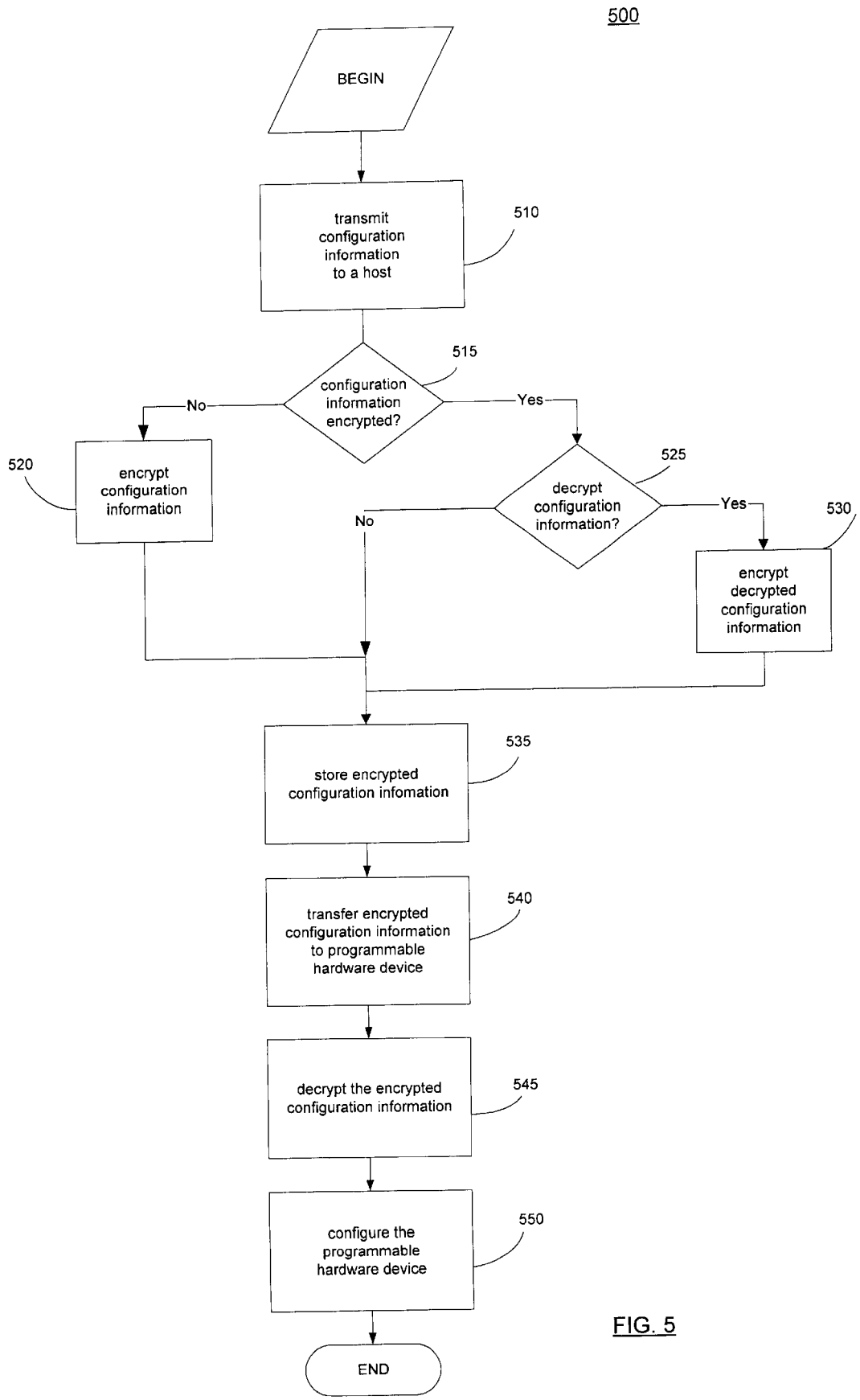
FIG. 5 is a flowchart of an embodiment of the present invention for securely configuring a programmable hardware device.

FIG. 5 shows a flowchart 500 of an embodiment of the present invention. At step 510, configuration information, defining a configuration for a target programmable hardware device, is transmitted to a host from an external source. The external source may be another host, a ROM, a disk, or main memory in a computer. The external source may also be a network on which the configuration information is stored in whole or parts. It should be recognized that the host may access the configuration information from the external source, or the external source may provide the configuration information to the host.

Upon being transmitted to the host, the host will determine if the configuration information received is encrypted, at step 515. If it is not, at step 520 the host will encrypt the configuration information according to any industry standard or accepted cryptographic algorithm, such as DES, 3DES, or RC4, for example. If the configuration information is encrypted, at step 525 the host will either decrypt it or store it at step 535 for passing on to the programmable hardware device. The host may decrypt the configuration information if it receives the configuration information encrypted according to one encryption algorithm, perhaps as part of a network transfer protocol such as IPSEC, and it is instructed to transfer the configuration information to the programmable hardware device according to a second algorithm, such as any other industry standard algorithm. After decryption, the host will again encrypt the configuration information at step 530 and then store it at step 535.

A person of ordinary skill in the art would recognize that steps 510–535 may also be performed as a manufacturing step if, for example, the host were to be simply a memory such as a programmable read-only memory (PROM). The PROM would be programmed, or burned in, with the configuration information during manufacturing of the PROM circuit boards.

Once stored, the encrypted configuration information is transferred to the programmable hardware device at step 540. Again, the transfer may be initiated by either the host or the programmable hardware device. The programmable hardware device will decrypt the encrypted configuration information at step 545. At step 550, the programmable logic modules will be configured according to the configuration information, to implement the desired logic or functionality.

In summary, the preferred embodiments described above allow for a new method of downloading configuration information to a programmable hardware device. The methods and apparatus in support of those methods allow for secure downloading of configuration information where the configuration information is provided to the programmable hardware device in encrypted form and decrypted at the device according to a cryptographic algorithm. This allows for securely configuring any types of reprogrammable hardware logic devices from a remote configuration source.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method of securely configuring a programmable hardware device from a host, wherein the programmable hardware device includes a plurality of programmable logic modules, and the host contains configuration information defining a function of the programmable logic modules, the method comprising the steps of:
   encrypting configuration information according to a cryptographic algorithm;
   transferring the encrypted configuration information from the host to the programmable hardware device;
   decrypting the configuration information according to the same cryptographic algorithm; and
   configuring the programmable logic modules in the programmable hardware device according to the decrypted configuration information.

2. A method of securely accessing information for configuring a programmable hardware device from an external memory source, the programmable hardware device having a plurality of programmable logic modules, the method comprising the steps of:
   encrypting configuration information according to a cryptographic algorithm, wherein the configuration information defines a function of the programmable logic modules;
   transmitting the encrypted configuration information to a host, the host being in communication with the programmable hardware device;
   storing the encrypted configuration information in a memory in the host;
   transferring the encrypted configuration information from the host memory to the programmable hardware device;
   decrypting the encrypted configuration information according to the cryptographic algorithm; and
   configuring the programmable logic modules in the programmable hardware device according to the decrypted configuration information.

3. The method of claim 2 wherein the cryptographic algorithm is a function of a packet transfer protocol that subdivides the configuration information into transmission packets.

4. The method of claim 2 further comprising the steps of:
   after storing the encrypted configuration information in a memory in the host, decrypting the encrypted configuration information according to the cryptographic algorithm; and
   again encrypting the decrypted configuration information according to a second cryptographic algorithm, and wherein the step of decrypting the configuration information by the programmable hardware device is performed according to the second cryptographic algorithm.

5. In a programmable hardware device having a plurality of programmable logic modules, a download engine for securely configuring the programmable logic modules from an external source, comprising:
   a data-in register having a communications channel for receiving encrypted configuration information from the external source, the configuration information defining a function of the programmable logic modules;
   a cryptographic engine coupled to the data-in register, and configured to decrypt the encrypted configuration information according to a cryptographic algorithm; and
   an interface coupled to the cryptographic engine, for transferring the decrypted configuration information from the cryptographic engine to the programmable logic modules.

6. The download engine of claim 5 further comprising a state machine controller configured to provide timing and control commands to the data-in register, the cryptographic engine, and the interface.

7. The download engine of claim 5 further comprising a nonvolatile key store for storing a cryptographic key provided to the cryptographic engine to decrypt the encrypted configuration information.

8. A system for securely configuring a programmable hardware device from an external source, wherein the programmable hardware device has a plurality of programmable logic modules, the system comprising:
   a host providing encrypted configuration information received from the external source, the configuration information defining a function of the programmable logic modules;
   a download engine having a communications channel for receiving encrypted configuration information form the host, and configured to decrypt the encrypted configuration information according to a cryptographic algorithm; and a configuration engine coupled to the download engine for receiving the decrypted configuration information and configuring the programmable logic modules.

9. The system of claim 8, wherein the host further comprises:

a first memory adapted to receive the configuration information from an external source;

a cryptographic engine having an input coupled to the first memory, for encrypting the configuration information according to a cryptographic algorithm; and a second memory coupled to the cryptographic engine, for storing the encrypted configuration information that is accessible by the download engine.

10. The system of claim 8, wherein the download engine further comprises:

a data-in register in communication with the host, for receiving the encrypted configuration information;

a cryptographic engine responsive to a cryptographic algorithm and key, for decrypting the encrypted configuration information with the key;

an interface for transferring the decrypted configuration information from the cryptographic engine to the configuration engine; and state machine controller configured to provide timing and control commands to the data-in register, the cryptographic engine, and the interface.

11. A computer readable medium embodying a computer program having instructions configured to cause a computer system to perform steps for securely configuring a programmable hardware device from a host, wherein the programmable hardware device includes a plurality of programmable logic modules, and the host contains configuration information defining a function of the programmable logic modules, the steps comprising:

encrypting configuration information according to a cryptographic algorithm;

transferring the encrypted configuration information from the host to the programmable hardware device;

decrypting the encrypted configuration information according to the cryptographic algorithm; and configuring the programmable logic modules in the programmable hardware device according to the decrypted configuration information.

12. The computer readable medium of claim 11, wherein the cryptographic algorithm is a function of a packet transfer protocol that subdivides the configuration information into packets.

13. A computer readable medium embodying a computer program having instructions configured to cause a computer system to perform steps for securely accessing information for configuring a programmable hardware device from an external memory source, the programmable hardware device having a plurality of programmable logic modules, the steps comprising:

encrypting configuration information according to a cryptographic algorithm, wherein the configuration information defines a function of the programmable logic modules;

transmitting the encrypted configuration information to a host, the host being in communication with the programmable hardware device;

storing the encrypted configuration information in a memory in the host;

transferring the encrypted configuration information from the host memory to the programmable hardware device;

decrypting the encrypted configuration information according to the cryptographic algorithm; and configuring the programmable logic modules in the programmable hardware device according to the decrypted configuration information.

14. The computer readable medium of claim 13, wherein the cryptographic algorithm is a function of a packet transfer protocol that subdivides the configuration information into packets.

15. The computer readable medium of claim 13, further comprising the steps of:

after storing the encrypted configuration information in a memory in the host, decrypting the encrypted configuration information according to the cryptographic algorithm; and again encrypting the decrypted configuration information according to a second cryptographic algorithm, and wherein the step of decrypting the configuration information by the programmable hardware device is performed according to the second cryptographic algorithm.

16. A download engine for securely configuring programmable logic modules within a programmable hardware device from an external source, comprising:

means for receiving encrypted configuration information defining a function of the programmable logic modules;

means for decrypting the encrypted configuration information according to a cryptographic algorithm; and means for transferring the decrypted configuration information from the cryptographic engine to the programmable logic modules.

17. The download engine of claim 16, further comprising means for providing timing and control commands.

18. The download engine of claim 16, further comprising means for storing a cryptographic key.

19. A system for securely configuring a programmable hardware device from an external source, wherein the programmable hardware device has a plurality of programmable logic modules, the system comprising:

means for providing encrypted configuration information, the configuration information defining a function of the programmable logic modules;

means for receiving encrypted configuration information;

means for decrypting the encrypted configuration information according to a cryptographic algorithm;

means for receiving the decrypted configuration information; and means for configuring the programmable logic modules.

20. The system of claim 19, further comprising:

means for receiving the configuration information from an external source;

means for encrypting the configuration information according to a cryptographic algorithm; and means for storing the encrypted configuration information.

21. The system of claim 19, wherein the cryptographic algorithm is a function of a packet transfer protocol that subdivides the configuration information into packets.

* * * * *